United States Patent
Taniguchi

(10) Patent No.: US 9,781,317 B2
(45) Date of Patent: Oct. 3, 2017

(54) ROTATION DETECTING DEVICE, CAMERA EQUIPPED WITH THE DEVICE, AND IMAGING APPARATUS EQUIPPED WITH THE CAMERA

(71) Applicant: Panasonic Intellectual Property Management Co., Ltd., Osaka (JP)

(72) Inventor: Takuo Taniguchi, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 15/066,170

(22) Filed: Mar. 10, 2016

(65) Prior Publication Data
US 2016/0191762 A1    Jun. 30, 2016

Related U.S. Application Data

(63) Continuation of application No. PCT/JP2014/006297, filed on Dec. 17, 2014.

(30) Foreign Application Priority Data

Feb. 7, 2014    (JP) ................................. 2014-021957

(51) Int. Cl.
H04N 5/225    (2006.01)
H04N 5/232    (2006.01)
(Continued)

(52) U.S. Cl.
CPC .......... *H04N 5/2253* (2013.01); *G03B 17/02* (2013.01); *G03B 17/04* (2013.01); *H04N 5/2252* (2013.01);
(Continued)

(58) Field of Classification Search
CPC .. H04N 5/2253; H04N 5/2252; H04N 5/2258; H04N 5/23293; G03B 17/02; G03B 17/04
(Continued)

(56) References Cited

U.S. PATENT DOCUMENTS 6,072,139 A * 6/2000 Nakase ................. H01H 1/245
                                                                200/553
7,053,320 B2 * 5/2006 Kodo ..................... H01H 19/62
                                                                200/11 R
(Continued)

FOREIGN PATENT DOCUMENTS

JP         8-84286        3/1996
JP      2000-333059      11/2000
(Continued)

OTHER PUBLICATIONS

International Search Report dated Mar. 31, 2015 in International (PCT) Application No. PCT/JP2014/006297.

*Primary Examiner* — Nhan T Tran
(74) *Attorney, Agent, or Firm* — Wenderoth, Lind & Ponack, L.L.P.

(57) ABSTRACT

A camera includes a camera-unit rotatably held which can change its photographing direction by rotation, and a rotation detecting device for detecting the rotation. The rotation detecting device includes: a detection part having a lever which self-returns to a reference position; a cam part, with which the lever part is contact, including a cut-out part in a part thereof; and a rotary body rotatable together with the camera-unit. In one-directional rotation about a shaft, the rotary body transitions at least among a first state of the lever not facing the cut-out part, a second state of the lever facing the cut-out part at the reference position, and a third state of the lever not facing the cut-out part. The detection part detects which one of the first, second, and third states the rotary body is in, and determines the photographing direction of the camera-unit based on the detected state.

5 Claims, 6 Drawing Sheets

(51) Int. Cl.
*G03B 17/02* (2006.01)
*G03B 17/04* (2006.01)

(52) U.S. Cl.
CPC ....... *H04N 5/2258* (2013.01); *H04N 5/23293* (2013.01); *G03B 2217/002* (2013.01)

(58) Field of Classification Search
USPC .......................................... 348/373, 333.06
See application file for complete search history.

(56) References Cited

U.S. PATENT DOCUMENTS

| | | | |
|---|---|---|---|
| 2005/0006210 A1* | 1/2005 | Kodo | H01H 19/62 200/17 R |
| 2005/0062876 A1 | 3/2005 | Okutani et al. | |
| 2005/0219372 A1 | 10/2005 | Watanabe | |
| 2008/0316686 A1 | 12/2008 | Yamazato et al. | |
| 2012/0270598 A1* | 10/2012 | Okuda | H04N 13/0239 455/556.1 |
| 2013/0032456 A1* | 2/2013 | Nakajima | H01H 19/005 200/336 |

FOREIGN PATENT DOCUMENTS

| | | |
|---|---|---|
| JP | 2003-051872 | 2/2003 |
| JP | 2003-262913 | 9/2003 |
| JP | 2004-281275 | 10/2004 |
| JP | 2005-32450 | 2/2005 |
| JP | 2005-51455 | 2/2005 |
| JP | 2005-080117 | 3/2005 |
| JP | 2005-323336 | 11/2005 |
| JP | 2008-034997 | 2/2008 |
| JP | 2009-005255 | 1/2009 |
| JP | 2010-252186 | 11/2010 |

* cited by examiner

ROTATION DETECTING DEVICE, CAMERA EQUIPPED WITH THE DEVICE, AND IMAGING APPARATUS EQUIPPED WITH THE CAMERA

BACKGROUND

1. Technical Field

The technology according to the present disclosure relates to rotation detecting devices, cameras equipped with the devices, and imaging apparatuses equipped with the cameras.

2. Description of the Related Art

Japanese Patent Unexamined Publication No. 2003-51872 discloses portable communication equipment which is equipped with a rotatable camera. Like this portable communication equipment, electronic apparatuses equipped with a rotation mechanism have been desired to offer more variations in their operations.

SUMMARY

A rotation detecting device according to the present disclosure includes: a detection part having a lever part which self-returns to a reference position, and a rotary body having a cam part which has a cut-out part in a part thereof, with the lever part being in contact with the cam part. In a course of rotation in one direction about a shaft, the rotary body transitions at least among a first state of the lever part not facing the cut-out part, a second state of the lever part facing the cut-out part at the reference position, and a third state of the lever part not facing the cut-out part. The detection part detects which one of the first, second, and third states the rotary body is in.

Moreover, a camera equipped with the rotation detecting device according to the present disclosure includes: a camera unit rotatably held and capable of changing its photographing direction by rotating the unit, and a rotation detecting device for detecting the rotation of the camera unit. The rotation detecting device includes: a detection part having a lever part which self-returns to a reference position; a cam part having a cut-out part in a part thereof and being in contact with the lever part; and a rotary body rotatable together with the camera unit. In a course of the rotation in one direction about a shaft, the rotary body transitions at least among a first state of the lever part not facing the cut-out part, a second state of the lever part facing the cut-out part at the reference position, and a third state of the lever part not facing the cut-out part. The detection part detects which one of the first, second, and third states the rotary body is in, and determines the photographing direction of the camera unit based on the detected state of the rotary body.

Moreover, an imaging apparatus equipped with the camera according to the present disclosure includes: a first camera mounted in a camera body; a second camera rotatably held by the camera body and capable of changing its photographing direction by rotating the second camera; and a rotation detecting device for detecting the rotation of the second camera. The rotation detecting device includes: a detection part having a lever part which self-returns to a reference position; a cam part having a cut-out part in a part thereof and being in contact with the lever part; and a rotary body rotatable together with the second camera. In a course of 2 the rotation in one direction about a shaft, the rotary body transitions at least among a first state of the lever part not facing the cut-out part, a second state of the lever part facing the cut-out part at the reference position, and a third state of the lever part not facing the cut-out part. The detection part detects which one of the first, second, and third states the rotary body is in, and determines the photographing direction of the second camera based on the detected state of the rotary body.

DETAILED DESCRIPTION

Hereinafter, descriptions will be made regarding a rotation detecting device according to the present disclosure, a camera equipped with the rotation detecting device, and an imaging apparatus equipped with the camera, by using a case of a digital video camera according to an embodiment, with reference to the accompanying drawings as deemed appropriate. However, descriptions in more detail than necessary will sometimes be omitted. For example, detailed descriptions of well-known items and duplicate descriptions of substantially the same configuration will sometimes be omitted, for the sake of brevity and easy understanding by those skilled in the art.

Note that the accompanying drawings and the following descriptions are presented to facilitate fully understanding of the present disclosure by those skilled in the art and, therefore, are not intended to impose any limitations on the subject matter described in the appended claims.

Exemplary Embodiments

1. Outline of Digital Video Camera 10

Figure 1:
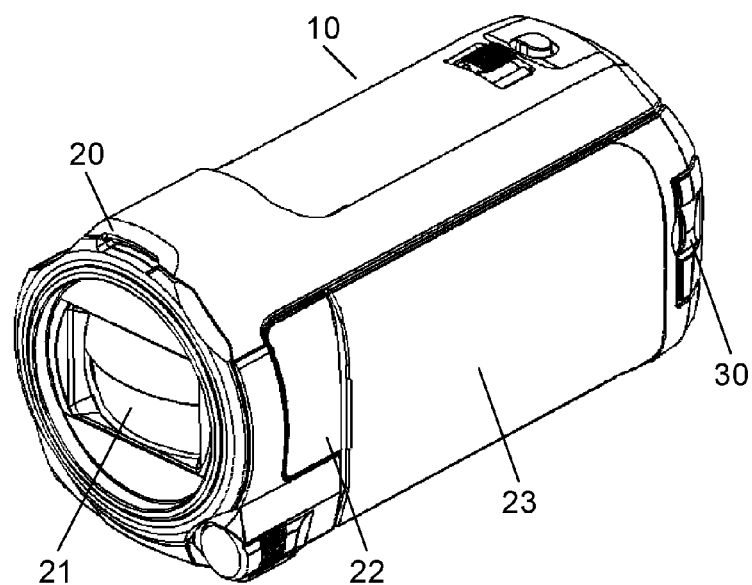
FIG. 1 is an external perspective view of digital video camera 10 according to an embodiment.

FIG. 1 is an external perspective view of digital video camera 10 according to the embodiment. As shown in FIG. 1, digital video camera 10 includes camera body 20, main camera 21 serving as a first camera mounted in camera body 20, opening-closing unit 23 which is connected, in an openable and closable manner, to camera body 20 via hinge unit 22.

One end of opening-closing unit 23 is connected to camera body 20 via hinge unit 22, so that the opening-closing unit is disposed in camera body 20 in an openable and closable manner, with hinge unit 22 as the rotation center. Moreover, opening-closing unit 23 includes sub-camera 30 at an end part of the openable and closable part of the opening-closing unit. The sub-camera is a second camera equipped with a rotation detecting device.

Figure 2:
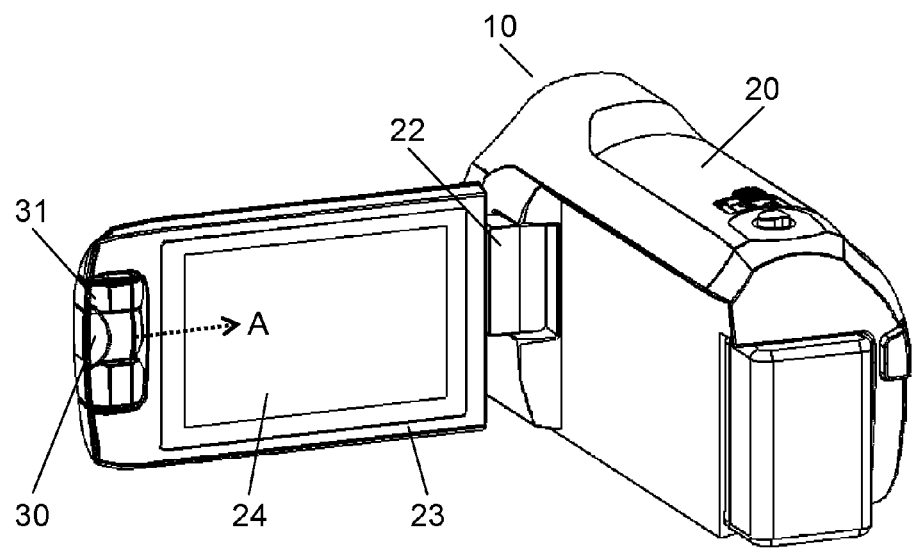
FIG. 2 is a perspective view of the digital video camera shown in FIG. 1, with an opening-closing unit being opened.
Figure 3:
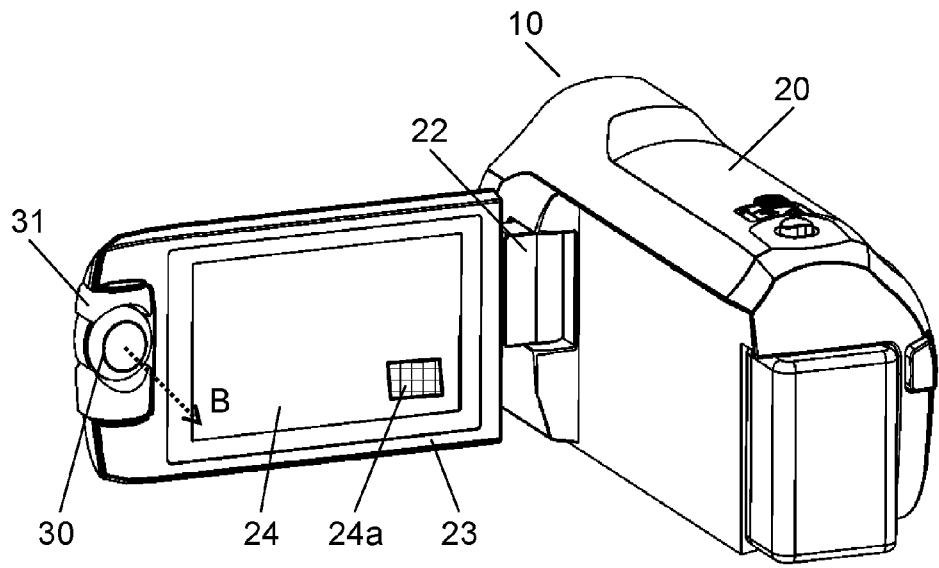
FIG. 3 is another perspective view of the digital video camera shown in FIG. 1, with the opening-closing unit being opened.
Figure 4:
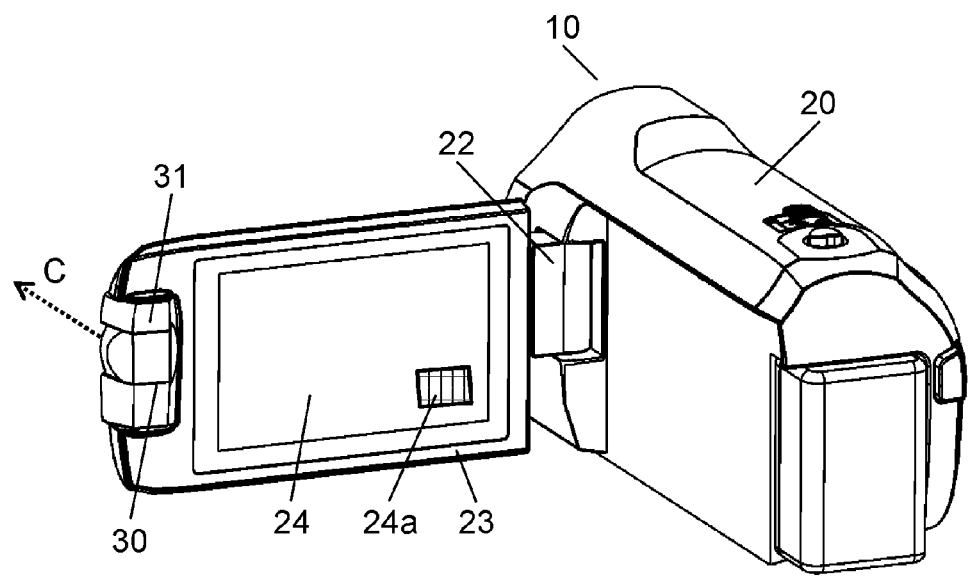
FIG. 4 is yet another perspective view of the digital video camera shown in FIG. 1, with the opening-closing unit being opened.

FIGS. 2, 3, and 4 are perspective views of digital video camera 10 shown in FIG. 1, with opening-closing unit 23 being opened. FIG. 2 is the perspective view showing a state in which sub-camera 30 is not used. FIGS. 3 and 4 are the perspective views showing states in which sub-camera 30 is used.

As shown in FIGS. 2, 3, and 4, sub-camera 30 is mounted in opening-closing unit 23 via hinge unit 31 serving as a rotating mechanism unit. This configuration allows sub-camera 30 to be rotated clockwise to change its photographing direction, e.g. from the state shown in FIG. 2 to the state shown in FIG. 3 and from the state shown in FIG. 3 to the state shown in FIG. 4. Reversely, sub-camera 30 can also be rotated counterclockwise to change the photographing direction, e.g. from the state shown in FIG. 4 to the state shown in FIG. 3 and from the state shown in FIG. 3 to the state shown in FIG. 2.

Moreover, although not shown in the figures, hinge unit 22 includes two shafts, i.e. a shaft for opening and closing which is connected to camera body 20 and another shaft for rotation which is disposed orthogonal to the shaft for opening and closing. This configuration allows opening-closing unit 23 to be moved in two manners, i.e. the opening/closing movement and the rotary movement, relative to camera body 20.

Sub-camera 30 mounted in opening-closing unit 23 can offer diversified photographing directions by combining these movements, i.e. the rotary movement of opening-closing unit 23 relative to camera body 20 and the clockwise or counterclockwise rotary movement of sub-camera 30 via hinge unit 31. For example, starting from the state shown in FIG. 3, opening-closing unit 23 can be rotated such that the photographing direction of sub-camera 30 is changed from the direction shown in FIG. 3 to a downward or upward direction.

In addition, as shown in FIG. 2, opening-closing unit 23 includes liquid-crystal display monitor unit 24. Liquid-crystal display monitor unit 24 is disposed between sub-camera 30 and camera body 20. In FIG. 2, sub-camera 30 is set such that its photographing-face (the lens side) faces the direction (direction "A" shown in FIG. 2) toward the inside of opening-closing unit 23, resulting in the non-usable state (State 1).

Next, as shown in FIG. 3, a photographer rotates sub-camera 30 to change the state of the sub-camera, from non-usable State 1 shown in FIG. 2 to usable State 2 (also referred to as "self-photographing state," hereinafter). In usable State 2, the photographing-face of the sub-camera faces the photographer side (direction "B" shown in FIG. 3). This operation allows the photographer to photograph himself or herself with sub-camera 30. At this time, liquid-crystal display monitor unit 24 displays the image that is photographed with main camera 21. Moreover, liquid-crystal display monitor unit 24 can display through image 24a of the self-portrait that is photographed with sub-camera 30, with the through image being superimposed on the image that is photographed with main camera 21. This configuration allows the photographer to take the self-portrait while checking the quality of his/her image.

Next, as shown in FIG. 4, the photographer rotates sub-camera 30 to change the state of the sub-camera, from self-photographing State 2 shown in FIG. 3 to usable State 3 (also referred to as "face-to-face photographing state," hereinafter). In usable State 3, the photographing-face of the sub-camera faces the same direction (direction "C" shown in FIG. 4) as that the photographing-face of main camera 21 faces. Here, the face-to-face photographing state, in which the photographing-faces of sub-camera 30 and main camera 21 face the same direction, means not only the case where the photographing-faces of sub-camera 30 and main camera 21 face exactly the same direction, but also the case where the sub-camera is photographing the direction that the photographer faces. This means that, in the face-to-face photographing state, there is no need for the photographing-faces of sub-camera 30 and main camera 21 to face exactly the same direction, as long as the sub-camera is photographing the direction that the photographer faces.

With this configuration, the photographer can use main camera 21 to photograph a subject in the distance, and can use sub-camera 30 to photograph a subject in the vicinity. At this time, liquid-crystal display monitor unit 24 can display through image 24a that is photographed with sub-camera 30, with the through image being superimposed on the image that is photographed with main camera 21.

2. Configuration of Block Circuits of Digital Video Camera 10

Figure 5:
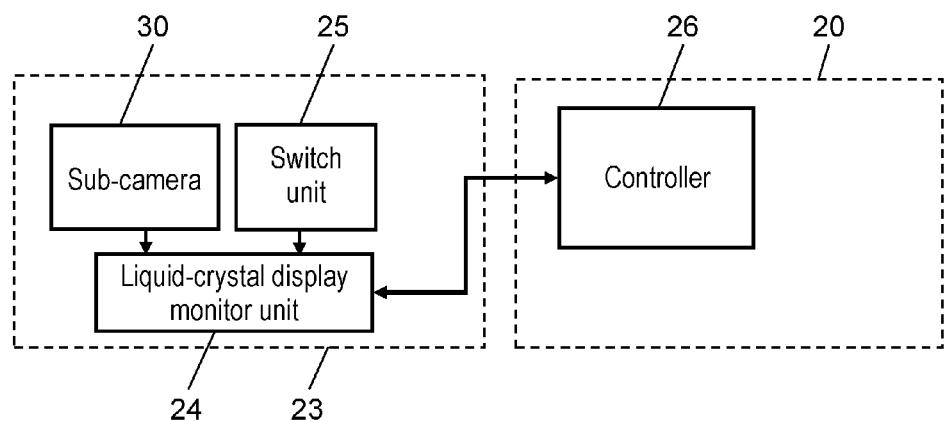
FIG. 5 is a schematic block diagram of a configuration of block circuits of the digital video camera.

FIG. 5 is a schematic block diagram of a configuration of block circuits of digital video camera 10. As shown in FIG. 5, opening-closing unit 23 of digital video camera 10 includes liquid-crystal display monitor unit 24, sub-camera 30, and switch unit 25 for detecting the rotary position of sub-camera 30. Camera body 20 of digital video camera 10 includes controller 26 into which information on the rotary position of sub-camera 30 is inputted, with the information being transmitted from switch unit 25.

Both the information on the rotary position of sub-camera 30 and the image signal from an imaging element of sub-camera 30 are transmitted to controller 26 of camera body 20, via an electronic control board (not shown in FIG. 5) disposed in liquid-crystal display monitor unit 24, with the information being transmitted from switch unit 25. Controller 26 is a controlling unit to control the whole of digital video camera 10. Such the controller can be implemented by using a microcomputer. Controller 26 may be configured only with hardware or, alternatively, may be implemented by combining hardware and software.

Moreover, controller 26 outputs, to liquid-crystal display monitor unit 24, image signals to display images including; images photographed by main camera 21 and sub-camera 30, and images of various kinds of menu screens for various settings. Although not shown in the figures, camera body 20 further includes, besides controller 26, an optical system configured with a lens group, an imaging element such as a CMOS imaging sensor, an image processor, a memory card slot, and an operation unit including a release button.

3. Configuration of Sub-Camera

Next, the configuration of the sub-camera part will be described.

Figure 6:
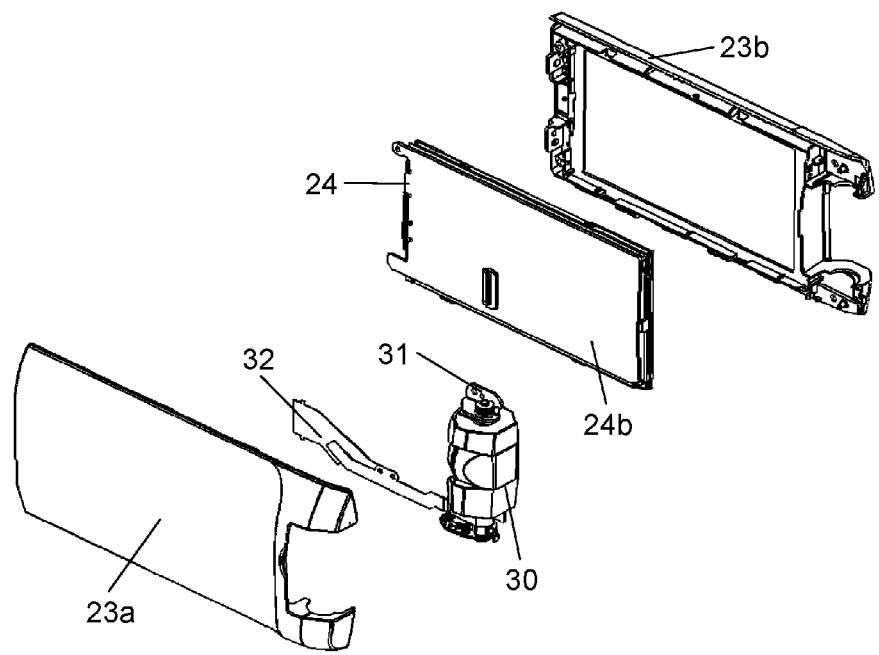
FIG. 6 is an exploded perspective view of the opening-closing unit.

FIG. 6 is an exploded perspective view of opening-closing unit 23. As shown in FIG. 6, opening-closing unit 23 includes: liquid-crystal display monitor unit 24, upper case 23a and lower case 23b, and sub-camera 30. The upper and lower cases are made of a resin material, and configure an exterior case which accommodates liquid-crystal display monitor unit 24. The sub-camera has hinge unit 31 that is held by upper case 23a and lower case 23b.

Liquid-crystal display monitor unit 24 includes electronic control board 24b on the upper case 23a side, i.e. the back side, of the display unit. Electronic control board 24b includes an electrical circuit to control liquid-crystal display monitor unit 24, a connector to which flexible printed-wiring board 32 is connected for taking out the electrical signals from sub-camera 30, and a connector through which the display monitor unit is electrically coupled with controller 26 of camera body 20. Electronic control board 24b is electrically coupled with controller 26 of camera body 20, thereby being configured to transmit and receive the image signals and control signals to and from controller 26.

Figure 7:
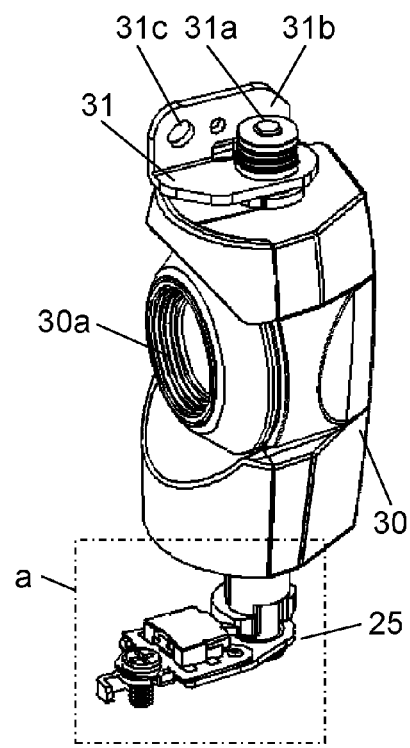
FIG. 7 is a perspective view of a sub-camera which is a camera equipped with a rotation detecting device.
Figure 8:
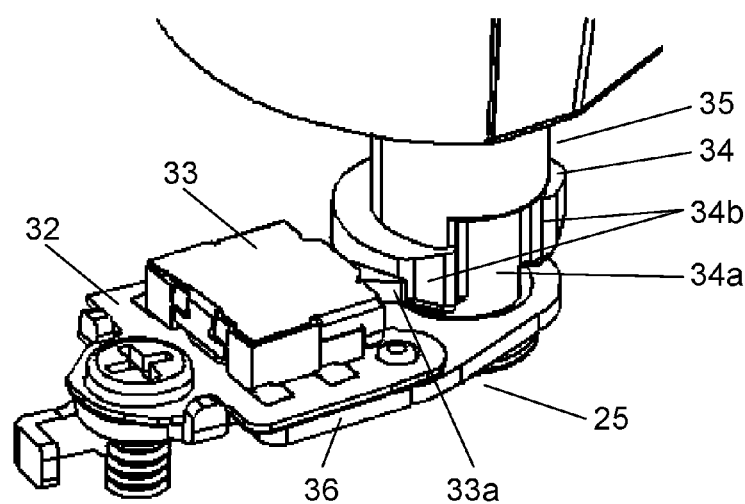
FIG. 8 is an enlarged perspective view of a switch unit part (part "a" of FIG. 7) which serves as the rotation detecting device.

FIG. 7 is a perspective view of the sub-camera which is a camera equipped with a rotation detecting device. FIG. 8 is an enlarged perspective view of a switch unit part (part "a" of FIG. 7) which serves as the rotation detecting device.

As shown in FIG. 7, sub-camera 30 according to the embodiment includes camera unit 30a, hinge unit 31, and switch unit 25. The camera unit includes an imaging element such as a CMOS imaging sensor and the lens group of an optical system. The hinge unit is disposed at the upper end part of camera unit 30a. The switch unit is disposed at the lower end part of camera unit 30a. Camera unit 30a of sub-camera 30 can be rotated about rotary shaft 31a, i.e. a rotation center, which is supported rotatably pivotally by hinge unit 31.

Moreover, switch unit 25 is configured to detect the rotary position of sub-camera 30 and to transmit an electrical signal to controller 26 of camera body 20 via flexible printed-wiring board 32 in accordance with the detected position. This electrical signal corresponds to one of the photographing states of the sub-camera which include: non-usable State 1 in direction "A" shown in FIG. 2, self-photographing State 2 in direction "B" shown in FIG. 3, and face-to-face photographing State 3 in direction "C" shown in FIG. 4.

Camera unit 30a of sub-camera 30 includes, as described above, the lens group of the optical system, and the imaging element such as the CMOS imaging sensor. The image signal photographed with camera unit 30a is transmitted to controller 26 of camera body 20 via flexible printed-wiring board 32.

Hinge unit 31 includes mounting unit 31b configured with a metal plate which is fixed, with screws and the like, to both upper case 23a and lower case 23b of opening-closing unit 23. Mounting unit 31b includes a screw-hole for mounting the hinge unit to opening-closing unit 23 with a screw. Hinge unit 31 is configured such that, for example, sub-camera 30 is subjected to a rotation range limitation of 270 degrees when it is rotated in one direction (clockwise or counterclockwise) about the axis, i.e. rotary shaft 31a. That is, sub-camera 30 is configured such that, when camera unit 30a is rotated about the axis of rotary shaft 31a in one direction (clockwise or counterclockwise), the camera unit cannot be rotated beyond the rotation range of 270 degrees due to a rotation limiter (not shown) disposed in hinge unit 31.

Next, the switch unit part serving as the rotation detecting device will be described.

As shown in FIG. 8, switch unit 25 is disposed in the lower end part of sub-camera 30. Switch unit 25 includes switch body 33, rotary piece 35, and fixing plate 36.

The switch body is a detection part which includes switch lever 33a serving as a lever part. The rotary piece is a rotary body which includes rotary cam 34 serving as a cam part with which switch lever 33a comes in contact. The fixing plate is configured with a metal plate to hold these parts of the switch unit.

Rotary piece 35 is disposed in a state of being supported rotatably pivotally by fixing plate 36, which allows the rotary piece to rotate following the rotation of camera unit 30a. That is, sub-camera 30 is disposed such that the hinge unit 31 side is supported rotatably pivotally by mounting unit 31b, and the switch unit 25 side is supported rotatably pivotally by fixing plate 36. Rotary cam 34 of rotary piece 35 includes rotary cam groove 34a, i.e. a cut-out part, and slopes 34b which each gradually incline inward from the outer circumference of rotary cam 34 toward rotary cam groove 34a. Rotary cam 34 is a cam structure which is configured around the axis of the rotary shaft of sub-camera 30. This structure is configured including a thick part, which is larger in thickness than the main shaft of the rotary axis, and rotary cam groove 34a having a groove shape which is formed by partially cutting out the thick part. Slopes 34b with a predetermined inclination are formed at the connecting portions (boundary portions) between the thick part, which is larger in thickness than the main shaft of the rotary axis, and rotary cam groove 34a which is the partial cut-out of the thick part.

Switch body 33 has a function of a holding unit to hold switch lever 33a and is electrically coupled with flexible printed-wiring board 32. Moreover, flexible printed-wiring board 32 is disposed such that the part, to which switch body 33 is mounted, of the board is fixed to fixing plate 36, with the board being electrically insulated from the fixing plate.

In the embodiment, switch lever 33a is configured to indicate three states: The first state is such that the lever is located at the center position, serving as a reference position; the second and third states are such that the lever is inclined to the left or right of the central reference position. Moreover, switch lever 33a is being biased by a biasing means disposed in the inside of switch body 33 such that which the switch lever can self-return to the central reference position even when the switch lever is shifted from the central reference position to the inclined position at the left or right of the reference position. Accordingly, upon released from the state of being inclined to either the left or the right relative to switch body 33, switch lever 33a self-returns to the central reference position, resulting from a bias force by the biasing means.

It is noted, however, that the reference position of switch lever 33a is not limited only to the center position. Alternatively, among the three positions of the center position and the left and right positions, either the left or the right position may be set as the reference position with the remaining two being set as the other positions, thereby configuring the three positions, which results in the three states to be indicated by the switch lever. Needless to say, the number of the states indicated by switch lever 33a is not limited to three; therefore, switch lever 33a may be configured to indicate four or five states, for example. It is essential for the switch lever to indicate at least three states, i.e. the first, second, and third states.

Switch lever 33a detects the different states in accordance with the inclination angle in the inclination direction of the switch lever relative to switch body 33. In the course of the rotation of sub-camera 30 about the rotary shaft in one direction either clockwise or counterclockwise, slopes 34b formed at both ends of rotary cam groove 34a of rotary cam 34 make a rotary motion while being in contact with switch lever 33a. Each of slope 34b is disposed to have at a predetermined inclination angle such that switch lever 33a can detect the different states which transition among State 1, State 2, and State 3 following the rotary motion of rotary cam 34.

Note that, in the case of the configuration in which the direction of the photographing-face of sub-camera 30 (i.e. the direction of the lens side of camera unit 30a) faces the photographer when switch lever 33a comes to the position facing rotary cam groove 34a, sub-camera 30 is preferably configured in the following manner. That is, the position of rotary cam groove 34a is designed such that an image of a part (rear portion) of camera body 20 is not appear accidentally in a photographed image in the direction of the lens side of camera unit 30a.

Moreover, rotary cam 34 is formed to be larger in thickness in the axial direction than switch lever 33a, which allows the switch lever 33a to be in contact with rotary cam 34 in a stable state.

Figure 9:
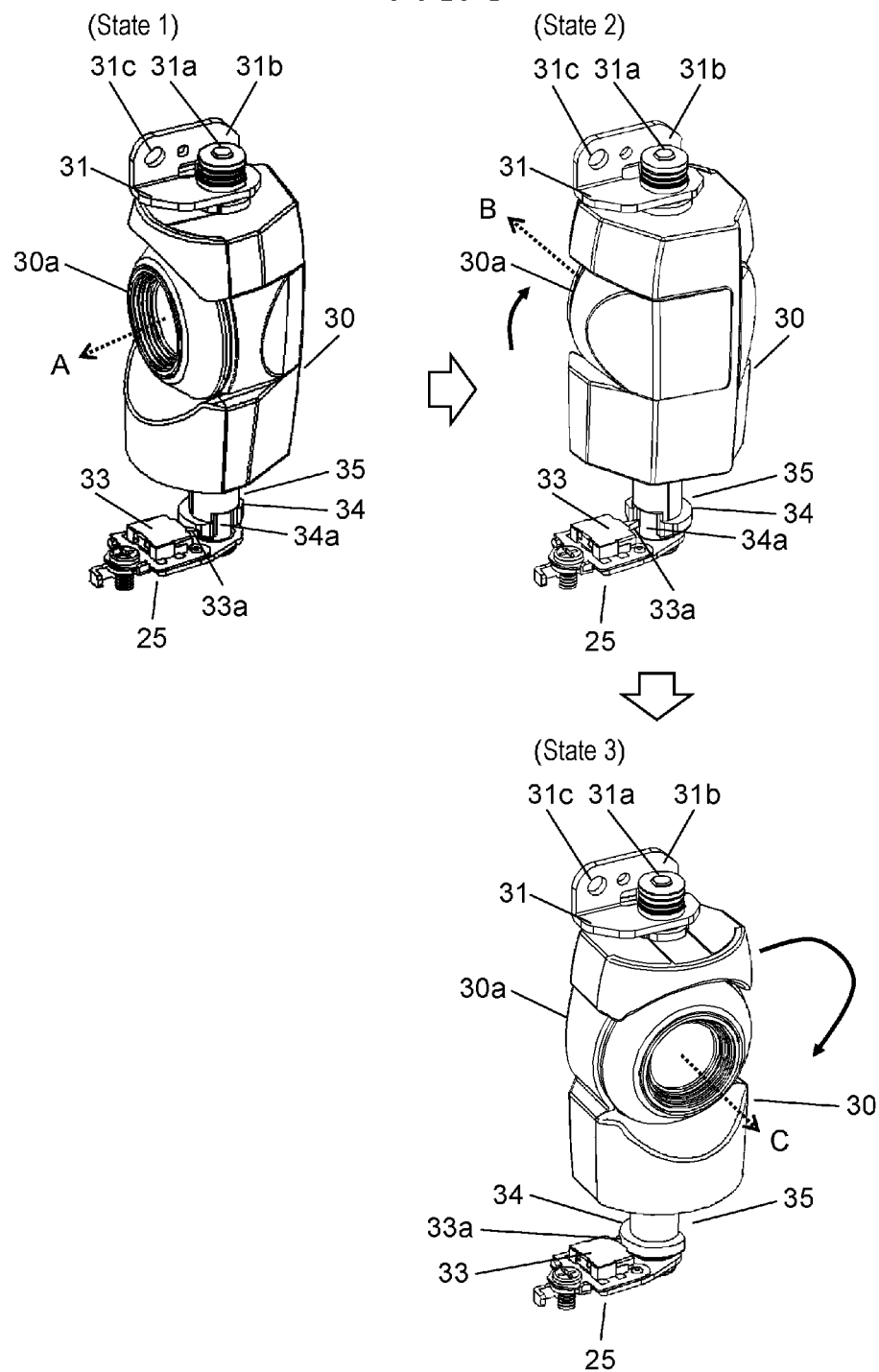
FIG. 9 is an illustrative view to illustrate transition states of the switch unit part when the sub-camera rotates.
Figure 10:
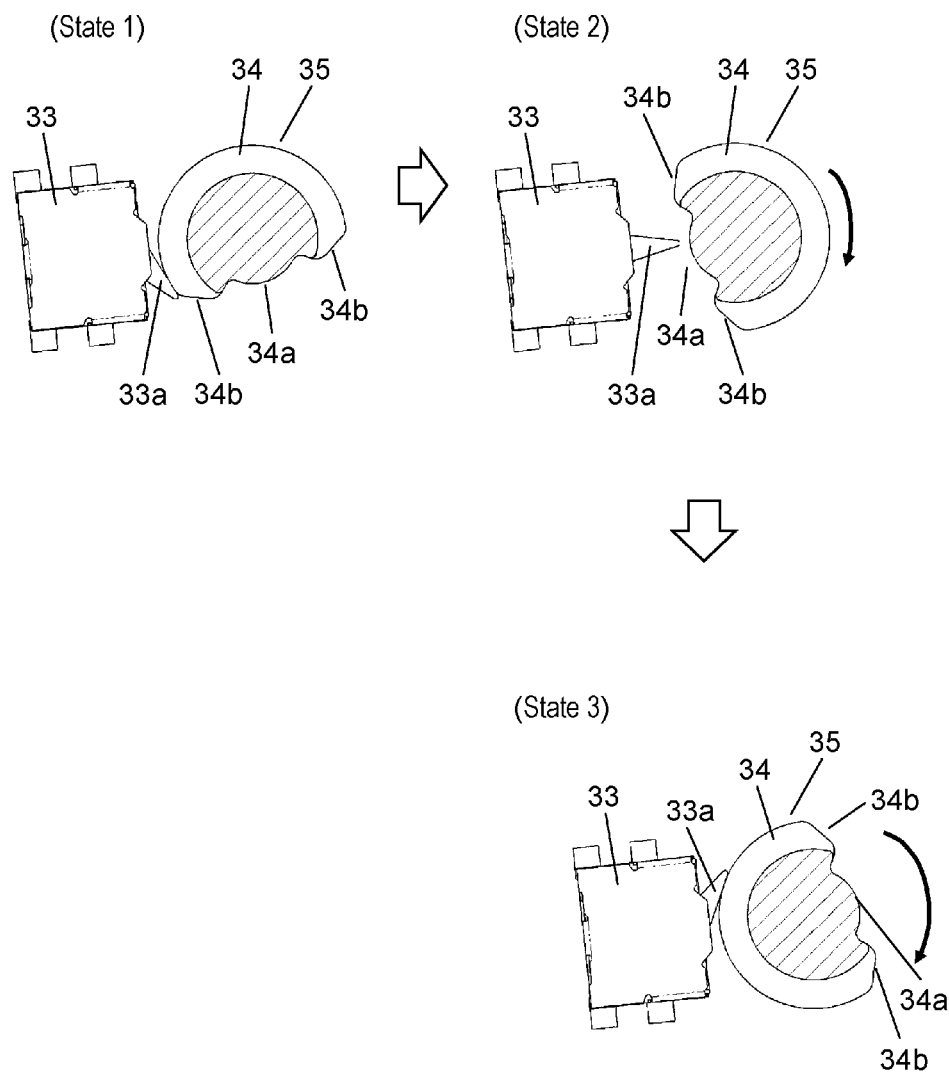
FIG. 10 is an illustrative view to illustrate positional relations of principal parts of the switch unit part, with the positional relations corresponding respectively to the transition states shown in FIG. 9.

4. Detection Operation of Rotation Detecting Device Following the Rotation of Sub-Camera FIG. 9 is an illustrative view to illustrate the transition states of the switch unit part when the sub-camera rotates. FIG. 10 is an illustrative view to illustrate the positional relations of principal parts of the switch unit part, with the positional relations corresponding respectively to the transition states shown in FIG. 9.

State 1 of FIG. 9 is one in which sub-camera 30 is in the non-usable state. Moreover, State 1 of FIG. 10 corresponds to State 1 of FIG. 9, and shows the positional relation between switch lever 33a and rotary piece 35, in switch unit 25, when sub-camera 30 is in the non-usable state.

The non-usable state, shown by State 1 of FIG. 9, of sub-camera 30 is one in which the imaging-face (lens side) of sub-camera 30 faces the direction (direction "A" shown in FIG. 2) toward the inside of opening-closing unit 23, as shown in FIG. 2. In this state, switch lever 33a is in contact with rotary cam 34 of rotary piece 35 as shown by State 1 of FIG. 10, resulting in the situation where the switch lever is inclined and biased in one direction relative to switch body 33. Then, switch body 33 transmits an electrical signal to controller 26 of camera body 20 via flexible printed-wiring board 32, with the signal indicating that the imaging-face of sub-camera 30 faces the direction of the non-usable state.

State 2 of FIG. 9 is one in which sub-camera 30 has rotated from the non-usable state to the self-photographing state. Moreover, State 2 of FIG. 10 corresponds to State 2 of FIG. 9, and shows the positional relation between switch lever 33a and rotary piece 35, in switch unit 25, when sub-camera 30 is in the self-photographing state.

The self-photographing state shown by State 2 of FIG. 9 is one in which the imaging-face (lens side) of camera unit 30a of sub-camera 30 rotates by a predetermined angle from State 1 of FIG. 9 to face the direction (direction "B" shown in FIG. 3) toward the photographer. That is, when sub-camera 30 is rotated to be in the self-photographing state, as shown in State 2 of FIG. 9, rotary cam groove 34a and switch lever 33a are in a positional relation in which they face each other. At this time, switch lever 33a is released from the state of being biased and inclined in one direction by rotary cam 34, and self-returns to the state of being at the central reference position. Then, switch body 33 transmits an electrical signal to controller 26 of camera body 20 via flexible printed-wiring board 32, with the signal indicating that the imaging-face of sub-camera 30 faces the direction of the self-photographing state.

State 3 of FIG. 9 is one in which sub-camera 30 has rotated from the self-photographing state to the face-to-face photographing state. Moreover, State 3 of FIG. 10 corresponds to State 3 of FIG. 9, and shows the positional relation between switch lever 33a and rotary piece 35, in switch unit 25, when sub-camera 30 is in the face-to-face photographing state.

The face-to-face photographing state shown by State 3 of FIG. 9 is one in which the imaging-face (lens side) of camera unit 30a of sub-camera 30 further rotates from State 2 of FIG. 9 to face substantially the same direction (direction "C" shown in FIG. 4) as that of the photographing-face of main camera 21 faces. That is, when sub-camera 30 rotates to be in the face-to-face photographing state, as shown in State 3 of FIG. 9, switch lever 33a comes in contact with slope 34b formed in rotary cam 34 of rotary piece 35. Subsequently, the switch lever comes to be being pushed by rotary cam 34, which biases the switch lever to incline toward the direction opposite to that of State 1 of FIG. 9. Then, switch body 33 transmits an electrical signal to controller 26 of camera body 20 via flexible printed-wiring board 32, with the signal indicating that the imaging-face of sub-camera 30 faces the direction of the face-to-face photographing state.

In this way, the rotation detecting device according to the present disclosure includes switch body 33 and rotary piece 35. The switch body includes switch lever 33a that is the lever part configured to self-return to the reference position. The rotary piece includes rotary cam 34 that is the cam part having rotary cam groove 34a, i.e. a cut out of a part of the cam, with which switch lever 33a is in contact. In the course of the rotation in one direction about the shaft, rotary piece 35 transitions at least among State 1, State 2, and State 3. State 1 is one in which switch lever 33a does not face rotary cam groove 34a. State 2 is one in which switch lever 33a faces rotary cam groove 34a, at the reference position. State 3 is one in which lever 33a does not face rotary cam groove 34a. Switch body 33, serving as the detection part, detects which one of State 1, State 2, and State 3 rotary piece 35 is in.

With this configuration, switch unit 25 operates such that switch lever 33a changes its orientation in accordance with the state of the photographing direction of sub-camera 30, i.e. direction "A" shown in FIG. 2, direction "B" shown in FIG. 3, or direction "C" shown in FIG. 4. Switch body 33, serving as the detection part of switch unit 25, is capable of transmitting the corresponding electric signal to controller 26, in accordance with the orientation of switch lever 33a.

Moreover, the camera equipped with the rotation detecting device according to the present disclosure includes sub-camera 30 and switch unit 25. The sub-camera is one that is rotatably held and capable of changing its photographing direction by rotating it. The switch unit is the rotation detecting device to detect the rotation of the camera. Switch unit 25 includes switch body 33, rotary cam 34, and rotary piece 35. The switch body includes switch lever 33a which is the lever part configured to self-return to the reference position. The rotary cam is the cam part which includes rotary cam groove 34a, a cut out of a part of the cam, with which switch lever 33a is in contact. The rotary piece is rotatable together with sub-camera 30. In the course of the rotation in one direction about the shaft, rotary piece 35 transitions at least among State 1, State 2, and State 3. State 1 is one in which switch lever 33a does not face rotary cam groove 34a. State 2 is one in which switch lever 33a faces rotary cam groove 34a, at the reference position. State 3 is one in which lever 33a does not face rotary cam groove 34a. Switch body 33, serving as the detection part, is configured to detect which one of State 1, State 2, and State 3 rotary piece 35 is in. Then the switch body determines the photographing direction of sub-camera 30 based on the detection of the state of rotary piece 35.

With this configuration, the signal transmitted from switch unit 25 allows the determination of which direction is the photographing direction of sub-camera 30, among direction "A" shown in FIG. 2, direction "B" in FIG. 3, and direction "C" in FIG. 4. Moreover, controller 26 of camera body 20 can perform the control in accordance with the electric signal transmitted from switch unit 25. For example, in the case where the imaging-face (lens side) of sub-camera 30 faces direction "B" shown in FIG. 3, i.e. in the self-photographing state, switch unit 25 transmits the electric signal corresponding to the self-photographing state to controller 26. This allows controller 26 to perform image processing suitable for images photographed in the self-photographing state. Specifically, in many cases in the self-photographing state, self-portraits of the photographer are photographed. Thus, controller 26 can perform preferable image processing including hue control and tone correction suitable for the portraits.

In this way, the camera equipped with the rotation detecting device according to the present disclosure is capable of detecting the photographing direction of sub-camera 30 based on which one of the states switch lever 33a is in. The states include: State 1 in which the switch lever is inclined by rotary cam 34 in one direction relative to switch body 33, State 2 in which the switch lever is at the reference position facing rotary cam groove 34a of rotary cam 34, and State 3 in which the switch lever is inclined by rotary cam 34 in the other direction relative to switch body 33. In addition, switch unit 25 serving as the rotation detecting device has such a simple structure that the switch unit can be disposed compactly in a small space inside the sub-camera.

Moreover, the imaging apparatus equipped with the camera according to the present disclosure includes main camera 21, sub-camera 30, and switch unit 25. The main camera is a first camera that is mounted in camera body 20. The sub-camera is a second camera that is rotatably held to camera body 20 and capable of changing its photographing direction by rotating it. The switch unit is the rotation detecting device to detect the rotation of the sub-camera. Switch unit 25 includes switch body 33, rotary cam 34, and rotary piece 35. The switch body includes switch lever 33a which is the lever part configured to self-return to the reference position. The rotary cam is the cam part which includes rotary cam groove 34a, a cut out of a part of the cam, with which switch lever 33a is in contact. The rotary piece is rotatable together with sub-camera 30. In the course of the rotation in one direction about the shaft, rotary piece 35 transitions at least among State 1, State 2, and State 3. State 1 is one in which switch lever 33a does not face rotary cam groove 34a. State 2 is one in which switch lever 33a faces rotary cam groove 34a, at the reference position. State 3 is one in which lever 33a does not face rotary cam groove 34a. Switch body 33, serving as the detection part, is configured to detect which one of State 1, State 2, and State 3 rotary piece 35 is in. Thus, the imaging apparatus is configured to determine the photographing direction of sub-camera 30 based on the signal from switch body 33.

With this configuration, the imaging apparatus can determine, from the signal transmitted from switch unit 25, which direction is the photographing direction of sub-camera 30, among direction "A" shown in FIG. 2, direction "B" in FIG. 3, and direction "C" in FIG. 4. Moreover, controller 26 of camera body 20 can perform the control in accordance with the electric signal transmitted from switch unit 25. For example, in the case where the imaging-face (lens side) of sub-camera 30 faces direction "B" shown in FIG. 3, i.e. being in the self-photographing state, switch unit 25 transmits the electric signal corresponding to the self-photographing state to controller 26. This allows controller 26 to perform image processing suitable for images photographed in the self-photographing state. Specifically, in many cases in the self-photographing state, self-portraits of the photographer are photographed. Thus, controller 26 can perform preferable image processing including hue control and tone correction suitable for the portraits.

In this way, the imaging apparatus according to the present disclosure is capable of detecting the photographing direction of sub-camera 30 based on which one of the states switch lever 33a is in. The states include: State 1 in which the switch lever is inclined by rotary cam 34 in one direction relative to switch body 33, State 2 in which the switch lever is at the reference position facing rotary cam groove 34a of rotary cam 34, and State 3 in which the switch lever is inclined by rotary cam 34 in the other direction relative to switch body 33. In addition, switch unit 25 serving as the rotation detecting device has such a simple structure that the unit can be disposed compactly in a small space inside the sub-camera. Furthermore, the imaging apparatus according to the present disclosure can change its photographing state in accordance with the state of sub-camera 30, which permits more diversified operation modes for the apparatus.

Note that, in the embodiment, the determination of the photographing direction is made in the following manner. That is, sub-camera 30 is determined to be in the non-usable state when switch lever 33a is in State 1; sub-camera 30 is determined to be in the self-photographing state when switch lever 33a is in State 2; sub-camera 30 is determined to be in the face-to-face photographing state when switch lever 33a is in State 3. However, the configuration of the determination is not limited to this. For example, the configuration may be such that, when switch unit 25 does not transmit any signal to controller 26, it indicates that sub-camera 30 is in any one of State 1, State 2, and State 3.

5. Other Exemplary Embodiments

As described above, the embodiments have been described to exemplify the technology disclosed in the present application. However, the technology is not limited to the embodiments, and is also applicable to other embodiments that are subjected, as appropriate, to various changes and modifications, replacements, additions, omissions, and the like.

For example, in the embodiments, the configuration is such that, in cases where the state transitions from the non-usable state (State 1) to the self-photographing state (State 2) and from the self-photographing state (State 2) to the face-to-face photographing state (State 3), the photographing-face of sub-camera 30 faces the direction toward the photographer when switch lever 33a comes to the position facing rotary cam groove 34a. However, other embodiments may adopt another configuration as follows. That is, in cases where the state transitions from the non-usable state to the face-to-face photographing state and from the face-to-face photographing state to the self-photographing state, the photographing-face of sub-camera 30 faces the direction of the face-to-face photographing when switch lever 33a comes to the position facing rotary cam groove 34a. That is, in cases where the state transitions at least among three states, switch lever 33a may be configured to come to the position facing rotary cam groove 34a when the sub-camera is in the central state.

Moreover, the shape of rotary cam groove 34a is not limited to the embodiments described above. For example, rotary cam groove 34a may be formed in an arc shape, by cutting out a part of the cam. Moreover, the configuration may be such that the state transitions when switch lever 33a comes to face slope 34b.

Moreover, in the embodiments, the configuration is such that the camera unit cannot be rotated beyond the rotation range of 270 degrees due to the rotation limiter (not shown) disposed in hinge unit 31; however, the present disclosure is not limited to this configuration. That is, hinge unit 31 may be equipped with no rotation limiter such that the sub-camera can be rotated beyond the rotation range of 270 degrees.

The technology according to the present disclosure is applicable to rotatable cameras and imaging apparatuses equipped with the rotatable cameras; such imaging apparatuses include digital video cameras, wearable cameras, and vehicle-mounted cameras.

What is claimed is:

1. An imaging apparatus comprising:
   a first camera mounted in a camera body;
   a second camera rotatably held by the camera body and capable of changing a photographing direction by rotating the second camera; and
   a single rotation detecting device for detecting rotation of the second camera, the single rotation detecting device including:
      a detection part having
         a lever part to self-return to a reference position;
      a cam part in contact with the lever part, the cam part having
         a thick part, and
         a cut-out part disposed in a portion of the thick part; and
      a rotary body rotatable together with the second camera,
   wherein the photographing direction of the second camera includes a self-photographing state in which a photographing-face of the second camera faces a photographer side, and a face-to-face photographing state in which the photographing-face of the second camera and a photographing-face of the first camera face an identical direction;
   in a course of the rotation in one direction about a shaft, the rotary body transitions at least among a first state of the lever part being in contact with the thick part, a second state of the lever part facing the cut-out part at the reference position, and a third state of the lever part being in contact with the thick part;
   the detection part detects which one of the first, second, and third states the rotary body is in; determines that the photographing direction of the second camera is in the self-photographing state when detecting that the rotary body is in the second state; and determines that the photographing direction of the second camera is in the face-to-face photographing state when detecting that the rotary body is in the third state.

2. The imaging apparatus according to claim 1, wherein, in the first state, the lever part is biased to incline in one direction relative to the reference position; and, in the third state, the lever part is biased to incline in the other direction relative to the reference position.

3. The imaging apparatus according to claim 1, wherein a slope is disposed at a connection portion between the thick part and the cut-out part.

4. The imaging apparatus according to claim 1, further comprising an opening-closing unit connected to the camera body in an openable and closable manner, wherein the second camera is disposed in the opening-closing unit via a rotating mechanism unit.

5. The imaging apparatus according to claim 1, wherein the second state is a predetermined angle range in which the camera body does not appear.

* * * * *